(12) United States Patent
Gmirya

(10) Patent No.: US 6,883,750 B2
(45) Date of Patent: Apr. 26, 2005

(54) SPLIT TORQUE GEARBOX WITH PIVOTED ENGINE SUPPORT

(75) Inventor: Yuriy Gmirya, Woodbridge, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/620,793

(22) Filed: Jul. 16, 2003

(65) Prior Publication Data

US 2005/0011990 A1 Jan. 20, 2005

(51) Int. Cl.$^7$ .............................................. B64D 27/00
(52) U.S. Cl. ............................. 244/54; 244/60; 244/66
(58) Field of Search ................................ 244/54, 17.11, 244/55, 60, 56, 66, 12.1, 12.3, 23 R, 23 B; 475/5, 317, 346, 347; 416/170 R; 248/554–557

(56) References Cited

U.S. PATENT DOCUMENTS

| | | | | | |
|---|---|---|---|---|---|
| 1,342,797 A | * | 6/1920 | Conti | ............................ | 60/717 |
| 2,481,547 A | * | 9/1949 | Walker et al. | ................. | 60/797 |
| 2,632,997 A | * | 3/1953 | Howard et al. | ................ | 60/797 |
| 3,253,474 A | * | 5/1966 | Ballauer et al. | ............. | 474/150 |
| 4,090,416 A | * | 5/1978 | Hicks | .............................. | 475/5 |
| 4,531,694 A | * | 7/1985 | Soloy | ........................... | 244/54 |
| 4,568,289 A | * | 2/1986 | Heidrich et al. | ............... | 440/3 |
| 4,872,624 A | * | 10/1989 | Hawener et al. | .............. | 244/54 |
| 4,998,995 A | * | 3/1991 | Blythe | ......................... | 244/55 |
| 5,020,740 A | * | 6/1991 | Thomas | ........................ | 244/93 |
| 5,271,295 A | * | 12/1993 | Marnot | ...................... | 74/665 B |
| 6,364,611 B1 | * | 4/2002 | Matsuda et al. | ......... | 416/170 R |
| 6,406,261 B1 | * | 6/2002 | Tsunoda | ...................... | 416/126 |
| 6,575,402 B1 | * | 6/2003 | Scott | .......................... | 244/12.2 |
| 2003/0010866 A1 | * | 1/2003 | Wilksch | ....................... | 244/54 |

* cited by examiner

Primary Examiner—Galen Barefoot
(74) Attorney, Agent, or Firm—Carlson, Gaskey & Olds

(57) ABSTRACT

A powerplant system for a vehicle such as a hybrid UAV includes a miniature gas turbine engine and a gearbox assembly. The engine is mounted to the gearbox assembly through a support structure which provides for pivotal movement of the engine relative thereto. The input gear is engaged with two gears such that the pivoted engine arrangement permits the input gear to float until gear loads between the input gear and the first and second gear are balanced. Regardless of the gear teeth errors or gearbox shaft misalignments the input gear will float and split the torque between the two gears.

19 Claims, 5 Drawing Sheets

SPLIT TORQUE GEARBOX WITH PIVOTED ENGINE SUPPORT

BACKGROUND OF THE INVENTION

The present invention relates to a vehicle propulsion system, and more particularly to a split torque gearbox for a miniature gas turbine engine powered hybrid unmanned aerial vehicle (UAV).

There is an increased emphasis on the use of UAVs for performing various activities in both civilian and military situations where the use of manned flight vehicles may not be appropriate. Such missions include surveillance, reconnaissance, target acquisition, target designation, data acquisition, communications relay, decoy, jamming, harassment, ordinance delivery, and supply.

One or more piston engines typically power UAV aircraft. Recently, miniature gas turbine engines are becoming more commonplace due to their high-power output, fuel flexibility and lesser noise signature. Disadvantageously, miniature gas turbine engines require relatively complicated gearbox assemblies to step down the speed of the high speed gas turbine engine rotor shaft to effectively power the lower speed flight systems such as rotor and translational propulsive systems typical of a hybrid UAV aircraft.

Typically, an input pinion to a conventional gearbox assembly requires a multiple of bearing supports and articulating couplings between the input pinion and gas turbine rotor shaft. These components increase gearbox assembly weight and sensitivity to shaft disbalance that may be substantial in high revolution miniature gas turbine engines. The bearings and couplings also require fine lubrication and alignment to operate which may complicate assembly and maintenance in a field environment.

Accordingly, it is desirable to provide a lightweight and uncomplicated powerplant system which efficiently steps down the output of a high speed gas turbine engine.

SUMMARY OF THE INVENTION

A powerplant system for a vehicle such as a hybrid UAV includes a miniature gas turbine engine and a gearbox assembly. The engine is mounted to the gearbox assembly through a support structure which provides for pivotal movement of the engine relative thereto.

A soft link provides for pivotal movement of the engine about a pivot axis. The pivot axis passes through the engine center of gravity. The engine drives a high speed rotor shaft and input gear along a gear axis which also passes through the engine center of gravity.

The input gear is engaged with two gears such that the pivoted engine arrangement permits the input gear to float until gear loads between the input gear and the first and second gear are balanced. Regardless of the gear teeth errors or gearbox shaft misalignments the input gear will float and split the torque between the two gears. As each load path transmits half of the torque, the face of the gears and bearing size can be reduced compared to a single path configuration.

Accordingly, the present invention provides a lightweight and uncomplicated powerplant system which efficiently steps down the output of a high speed gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION ON OF THE PREFERRED EMBODIMENT

Figure 1:
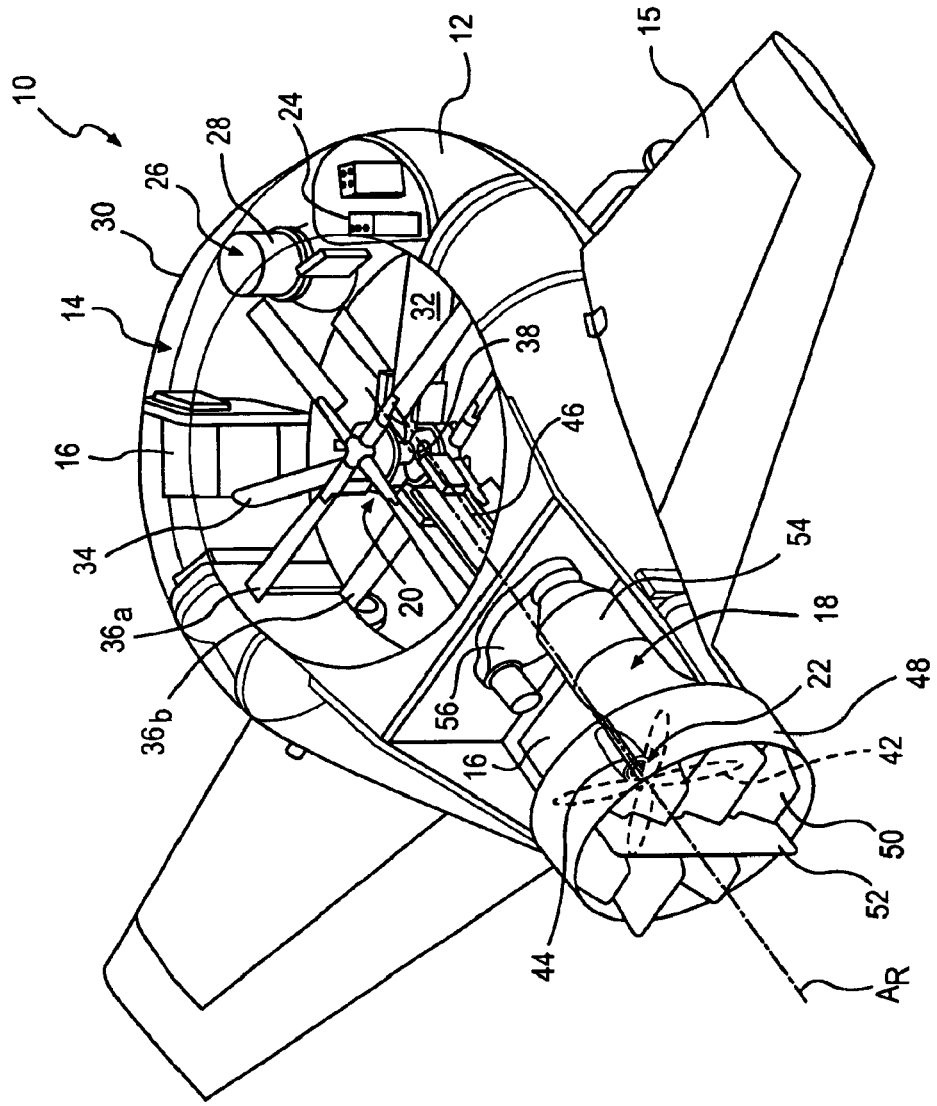
FIG. 1 is a partially phantom view of an exemplary hybrid aircraft having a flight control system according to the present invention.

FIG. 1A illustrates a remotely controlled vehicle 10, such as the Unmanned Aerial Vehicle (UAV) developed by Sikorsky Aircraft Corporation. The vehicle 10 includes a fuselage 12 with a toroidal portion 14 having a generally hemi-cylindrical aerodynamic profile. Wings 15 extend laterally outward from the aircraft fuselage 12 to provide high lifting forces and a nose-down pitching moment in forward translational flight.

The fuselage 12 includes a plurality of accessible internal bays 16 for housing and/or storing aircraft flight and mission components. Preferably, the bays 16 house one or more powerplant systems 18 to drive a rotor system 20 and a translational propulsion system 22. The bays 16 also include a flight control system 24, which generally includes flight computers, transmitters, receivers, navigation sensors, and attitude sensors well known in the UAV field.

Mission related sensors 26, such as a camera system, forward looking infrared radar (FLIR) sensor, laser designator, thermal imager, communications, or the like are also preferably located in a trainable turret 28 in a forward area 30 of the vehicle 10. It should be understood that although a particular component arrangement is disclosed in the illustrated embodiment, other arrangements, replaceable mission packages, weapon systems and the like will benefit from the instant invention.

The rotor system 20 is mounted within a duct 32 that extends substantially vertically through the body 12. A plurality of struts 34 extend between the body and the rotor system 20 to rigidly attach the rotor system 20 in a fixed co-axial relation with respect to the duct 32. The support struts 34 provide structural rigidity to the aircraft duct 32 to prevent flight and ground loads from distorting the body 12. The support struts 34 are hollow structures that operate as conduits for interconnecting operating elements of the UAV 10.

The system 20 includes a pair of multi-bladed, counter-rotating rotors 36a, 36b, coaxially aligned with the duct 32, and a coaxial transmission therebetween (illustrated somewhat schematically at 38). Each counter-rotating rotor 36a, 36b preferably includes a plurality of blade assemblies in which blade pitch changes, i.e., cyclic and/or collective pitch inputs, can be utilized to generate lift, pitch, yaw, and roll control of the aircraft 10.

The translational propulsion system 22 includes a pusher prop 42 mounted to a rear portion of the vehicle 10. The prop 42 is preferably mounted to the rear of the aircraft with its rotational axis Ar oriented substantially horizontal. The pusher prop 42 is mounted to a translational driveshaft 44 which transmits power from the powerplant system 18 to drive the pusher prop 42.

A rotor driveshaft 46 extends from the powerplant system 18 to transfer power developed thereby to the coaxial transmission 38 which drives the rotor system 20. Preferably, the rotor driveshaft 46 extends through a support strut 34.

A prop shroud 48 is formed on the aft portion of the fuselage 12 and around the pusher prop 42. The cross-sectional shape of the shroud 48 is preferably configured as an airfoil to provide the shroud 48 with a lift component. Mounted on the shroud 48 aft of the pusher prop 42 are one or more horizontal and vertical control surfaces 50,52. Preferably, the control surfaces 50,52 are pivotally mounted to the shroud 48 to permit the exhausted air to be channeled in a controllable manner such that the horizontal control surfaces 50 function as elevators and the vertical control surfaces 52 function as rudders.

Figure 2:
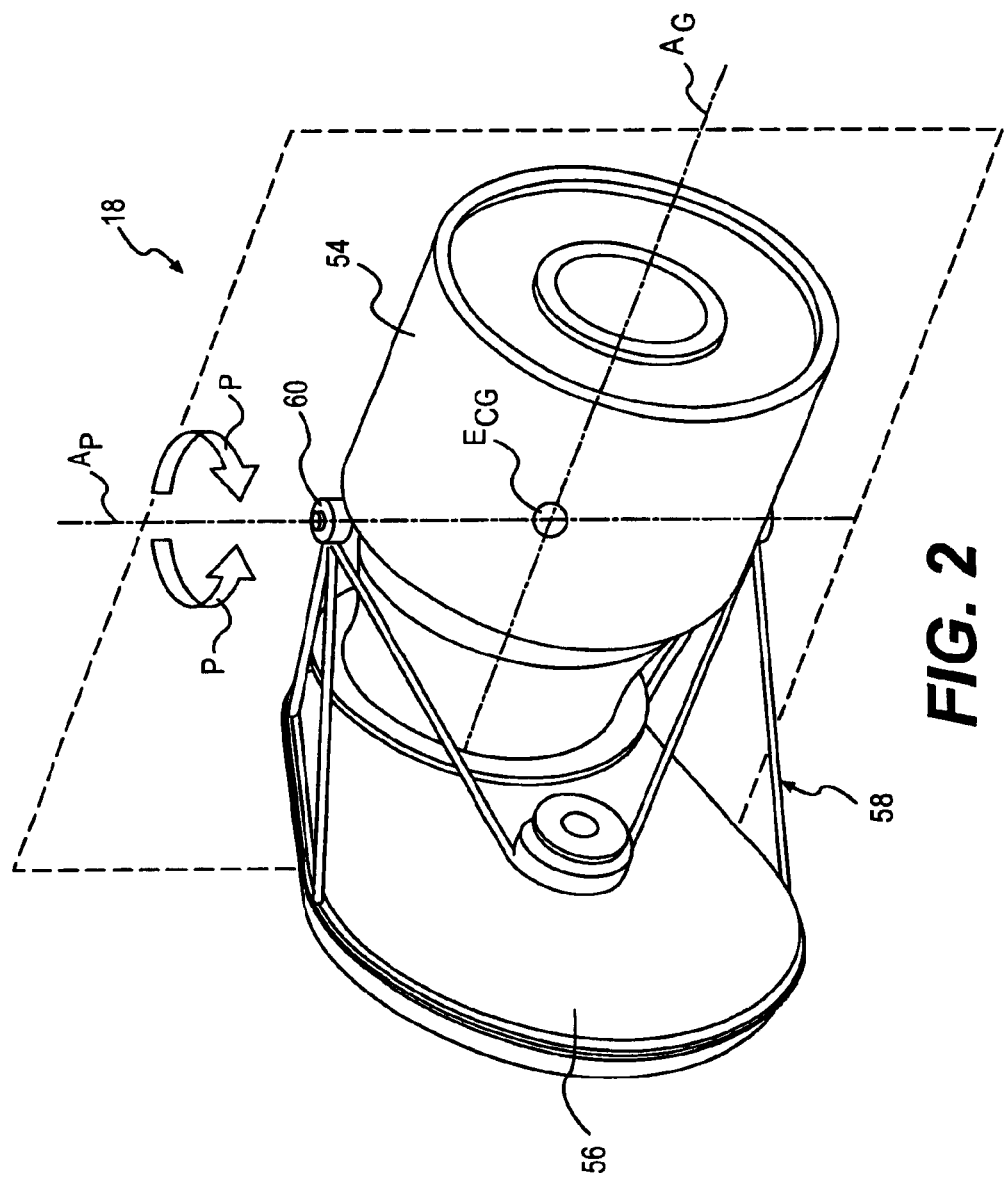
FIG. 2 is a general perspective view of a propulsion system according to the present invention.

Referring to FIG. 2, the powerplant system 18 is schematically illustrated. The powerplant system 18 generally includes an engine 54 such as a miniature gas turbine engine and a gearbox assembly 56. The engine 54 is mounted to the gearbox assembly 56 through a support structure 58 which provides for pivotal movement (schematically illustrated by arrows P) of the engine 54 relative thereto. The gearbox assembly 56 is preferably relatively rigidly mounted within one of the accessible internal bays 16 (FIG. 1) such that the output thereof is defined along the rotational axis Ar.

A soft link 60 such as resilient member or the like provides for pivotal movement of the engine 54 along a pivot axis Ap. The pivot axis Ap preferably passes through the engine center of gravity Ecg.

Figure 3:
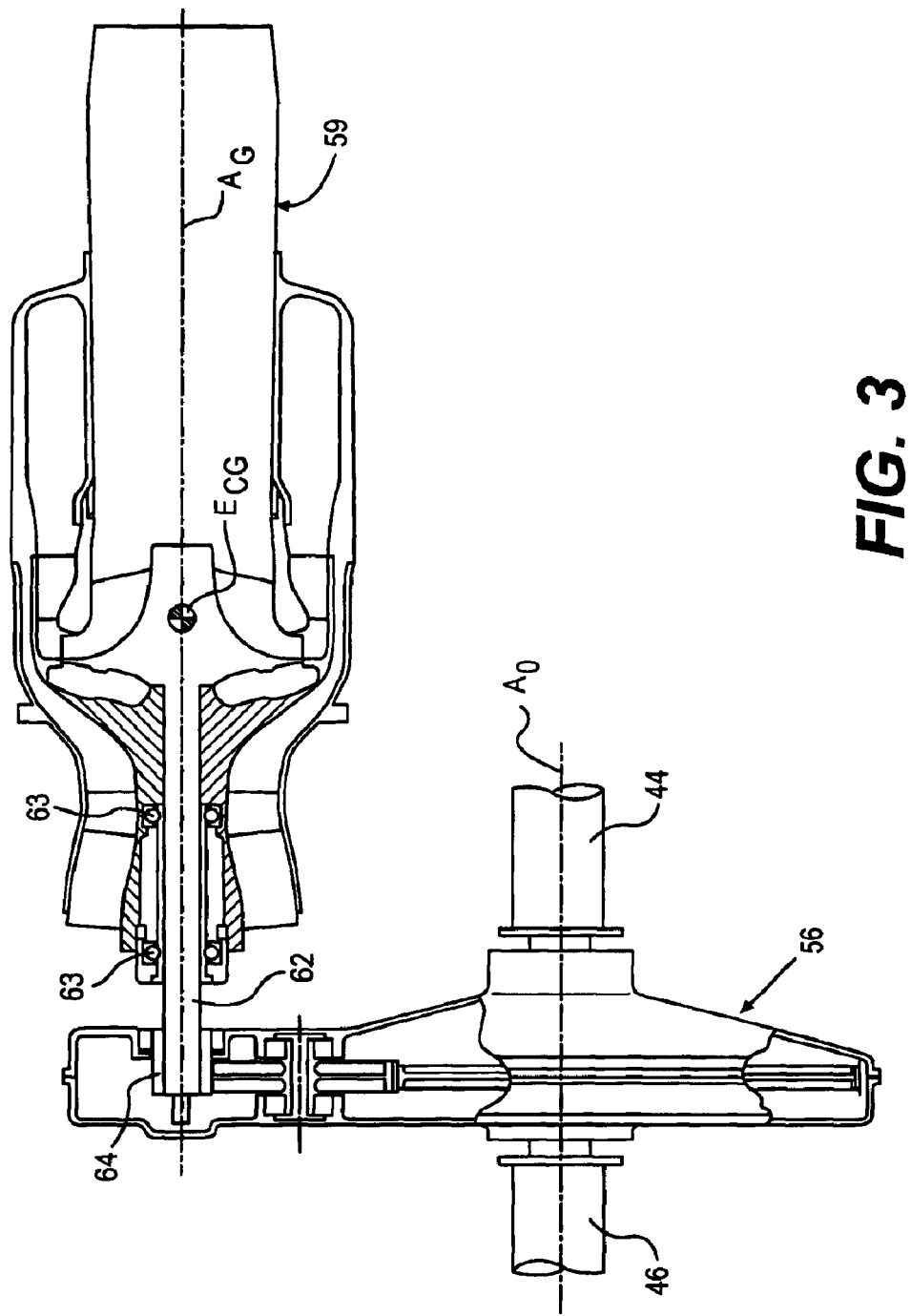
FIG. 3 is a general sectional view of a propulsion system.

Referring to FIG. 3, the engine 54 drives a high speed rotor shaft 62 and input gear 64 along a gear axis Ag (also illustrated in FIG. 3). The gear axis Ag also passes through the engine center of gravity Ecg. The pivot axis Ap and the gear axis Ag are thereby contained within a common plane (FIG. 2) in which the pivot axis Ap and gear axis Ag cross at the engine center of gravity Ecg. Notably, the rotor shaft bearings (illustrated schematically at 63) upon which the rotor shaft 62 is mounted are preferably the only support bearings for input gear 64.

Figure 4:
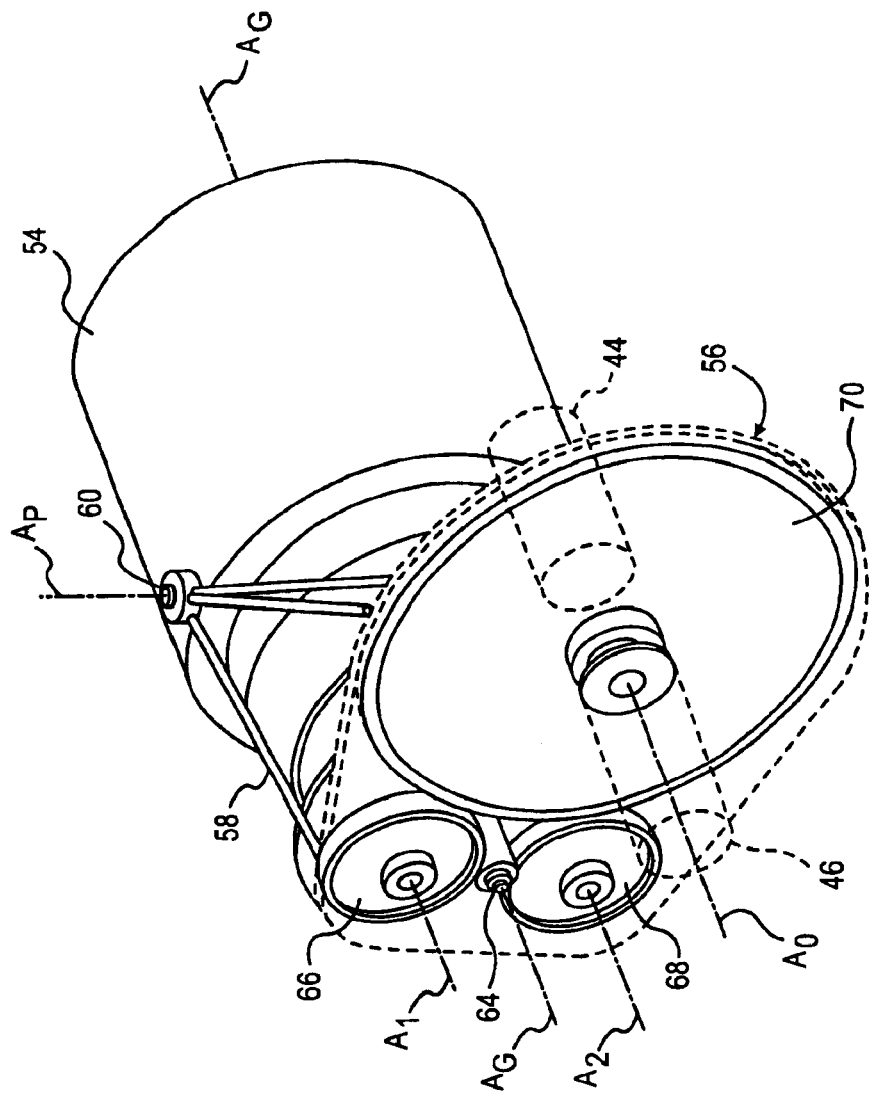
FIG. 4 is a general partial phantom perspective view of a propulsion system.

Referring to FIG. 4, the input gear 64 engages a first gear 66 and a second gear 68. The input gear 64 is defined a long the gear axis Ag, the first gear 66 defines a first gear axis of rotation A1, and the second gear 68 defines a second gear axis of rotation A2. The axes Ag, A1, and A2 are preferably located transverse to the pivot axis Ap.

The first gear 66 and the second gear 68 engage an output gear 70. The output gear 70 defines an output axis of rotation Ao. The output gear 70 defines an output axis of rotation Ao which corresponds with the rotational axis Ar (FIG. 1). The output gear 70 is rotationally connected to the translational driveshaft 44, and the rotor driveshaft 46 to respectively power the translational propulsion system 22 and the rotor system 20 (FIG. 1). The gearbox assembly 56 thereby transmits power along multiple paths and transmits torque from the high-speed engine turning at over 100,000 rpm to the lower speed output shaft 44, 46 turning at approximately 7750 rpm while providing equal gear load distribution due to pivoted engine support structure. It should be understood that other gear arrangement downstream of gears 66, 68 will also benefit from the present invention.

Figure 5:
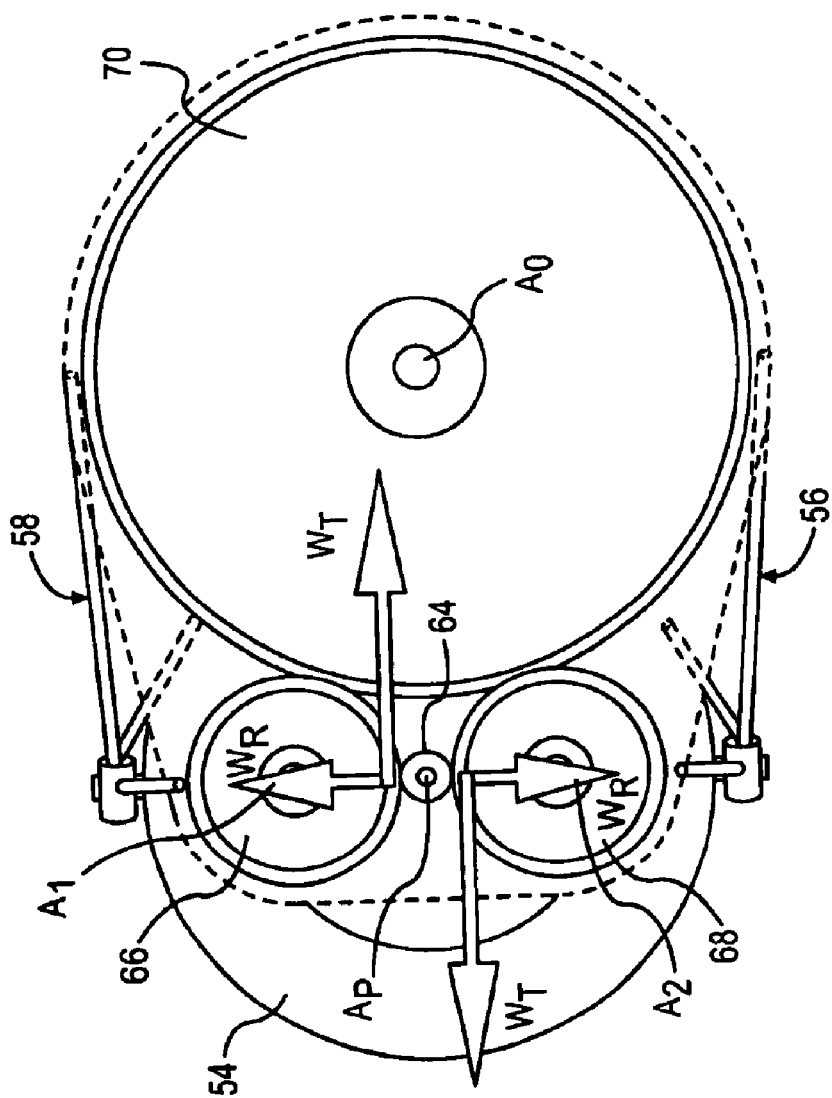
FIG. 5 is force diagram of the propulsion system according to the present invention.

Referring to FIG. 5, a force diagram of the input gear 64 interaction is illustrated. Since the input gear 64 is engaged with two gears 66, 68 the pivoted engine arrangement permits the input gear 64 to float until gear loads between the input gear 64 and the first and second gear 66, 68 are balanced. Regardless of the gear teeth errors or gearbox shaft misalignments the input gear will float and split the torque between gears 66, 68. As each load path transmits a half of the torque the face of the gears and bearing size can be reduced compare to a single path configuration.

The present invention eliminates the weight, cost, and complexity of numerous otherwise required flex couplings and multiple bearings. The removal of the multiple bearings also eliminates some frictional loss due to bearing drag.

It should be understood that other dedicated rotary or fixed wing vehicles will also benefit from the present invention. Any vehicles which utilize miniature gas turbine engines such as reconnaissance drones, guided missiles, decoys and other systems including ground and water based applications will also benefit from the present invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A propulsion system comprising:
   a first gear;
   a second gear;
   a gas turbine engine pivotally mounted along a pivot axis passing through a center of gravity of said gas turbine engine; and
   an input gear driven by said gas turbine engine, said input gear engaged with said first gear and said second gear.

2. The propulsion system as recited in claim 1, wherein said first gear and said second gear engage an output gear.

3. The propulsion system as recited in claim 2, wherein said output gear drives an output shaft.

4. The propulsion system as recited in claim 1, wherein said first gear defines a first axis of rotation, said second gear defines a second axis of rotation and said input gear defines a gear axis of rotation, said first, second and input axis of rotation transverse said pivot axis.

5. The propulsion system as recited in claim 4, wherein said pivot axis and said gear axis are contained within a common plane.

6. The propulsion system as recited in claim 1, further comprising a gearbox assembly which contains said first gear, said second gear and said input gear.

7. The propulsion system as cited in claim 6, further comprising a support structure which mounts said gas turbine engine to said gearbox assembly.

8. The propulsion system as recited in claim 1, wherein said first gear and said second gear engage an output gear, said output gear driving a first shaft and a second shaft, said first shaft drives a translational propulsion system and said second shaft drives a rotor system.

9. A hybrid unmanned aerial vehicle comprising:

a fuselage defining a duct;

a coaxial transmission driving a counter-rotating rotor system within said duct;

a gas turbine engine pivotally mounted along a pivot axis, said pivot axis passing through a center of gravity of said gas turbine engine;

an input gear driven by said gas turbine engine, said input gear engaged with a first gear and a second gear;

an output gear engaged with said first gear and said second gear;

a first shaft driven by said output gear, said first shaft driving a translational propulsion system; and a second shaft driven by said output gear, said second shaft driving said coaxial transmission.

10. The hybrid unmanned aerial vehicle as recited in claim 9, wherein said first gear defines a first axis of rotation, said second gear defines a second axis of rotation and said input gear defines a gear axis of rotation, said first, second and gear axis of rotation transverse the pivot axis.

11. The hybrid unmanned aerial vehicle as recited in claim 10, wherein said pivot axis and said gear axis are contained within a common plane.

12. A method of splitting torque from a gas turbine engine comprising the steps of:

(1) pivotally mounting a gas turbine engine along a pivot axis through a center of gravity of the gas turbine engine;

(2) driving an input gear with the gas turbine engine; and (3) engaging the input gear with a first gear and a second gear.

13. A method as recited in claim 12, further comprising the step of:

driving an output gear with the first and second gear.

14. A method as recited in claim 12, wherein said step (2) further comprises the step of:

mounting the input gear directly to a shaft of the gas turbine engine.

15. A method as recited in claim 12, further comprising the steps of:

locating a first axis of rotation of the first gear transverse the pivot axis;

locating a second axis of rotation of the second gear transverse the pivot axis;

locating a gear axis of rotation of the input gear transverse the pivot axis.

16. A method as recited in claim 15, further comprising the step of:

locating the pivot axis and the gear axis within a common plane.

17. A propulsion system comprising:

a gearbox assembly;

a gas turbine engine pivotally mounted to said gearbox assembly along a pivot axis; and a rotor shaft driven by said gas turbine engine, said rotor shaft engaged with said gearbox assembly such that said gas turbine engine is free to pivot about said pivot axis during operation of said gas turbine operation.

18. The propulsion system as recited in claim 17, further comprising an input gear driven by said rotor shaft, said input gear in meshing engagement with a first gear and a second gear within said gearbox assembly, pivoting of said gas turbine engine about said pivot axis permitting said input gear to float relative said first gear and said second until gear loads between said input gear and said first and second gear balance.

19. The propulsion system as recited in claim 17, wherein said pivot axis passing through a center of gravity of said gas turbine engine.

\* \* \* \* \*